United States Patent [19]

Homeier

[11] 3,761,537

[45] Sept. 25, 1973

[54] DISMUTATION OF OLEFINS

[75] Inventor: Edwin H. Homeier, Maywood, Ill.

[73] Assignee: Universal Oil Products Company, Des Plaines, Ill.

[22] Filed: Nov. 18, 1971

[21] Appl. No.: 200,238

[52] U.S. Cl. ............................................. 260/683 D
[51] Int. Cl. ............................................. C07c 3/62
[58] Field of Search ............................... 260/683 D

[56] References Cited
UNITED STATES PATENTS

| | | | |
|---|---|---|---|
| 3,530,196 | 9/1970 | Singleton | 260/683 |
| 3,535,401 | 10/1970 | Calderon et al. | 260/683 |
| 3,558,515 | 1/1971 | Kittleman et al. | 260/683 |
| 3,652,704 | 3/1972 | Eades et al. | 260/683 |

Primary Examiner—Delbert E. Gantz
Assistant Examiner—C. E. Spresser
Attorney—J. R. Hoatson, Jr. et al.

[57] ABSTRACT

Olefinic hydrocarbons are subjected to a dismutation process by treatment with a catalyst comprising a metal oxyhalide in which the metal is present in an intermediate valence state to form dissimilar olefins which contain one or more carbon atoms less and one or more carbon atoms more than the original olefinic hydrocarbon.

12 Claims, No Drawings

DISMUTATION OF OLEFINS

This invention relates to a process for the dismutation of hydrocarbons. More particularly the invention is concerned with the process for the dismutation of olefinic hydrocarbons utilizing a catalyst of the type herein set forth in greater detail.

Olefinic hydrocarbons are important compounds in the preparation of many chemical compositions of matter. The olefinic hydrocarbons, either in a gaseous or in liquid form, are utilized as intermediates in the preparation of many chemical compounds. For example, ethylene is used as a source for polyethylene, synthetic ethyl alcohol, styrene, ethyl chloride, ethylene dichloride, ethylene dibromide, etc. In addition it is also used in the coloring of fruit and in the blanching of vegetables, for oxyethylene welding and for cutting of metals, in medicine as an anesthetic, etc. Propylene is used in the process for preparing isopropylene alcohol, propylene trimer and dimer, it the synthesis of cumene, isoprene, polypropylene etc. Likewise the butenes are useful in polymer and alkylate gasolines, as solvents, cross-linking agents, butadiene synthesis, aldehydes, alcohols, etc. The higher molecular weight olefins such as the nonenes are used in organic synthesis, as wetting agents, lube oil additives, for alkylation and as chemical intermediates for surfactants. The decenes are used in organic syntheses of flavors, perfumes, pharmaceuticals, dyes, oils, resins, etc.

In many instances olefinic hydrocarbons may be present in an excess of one particular olefin over that of another particular type of olefin. For example, propylene and ethylene may be present in flue gases and if a demand for the butenes exceeds the demand for propylene it is possible, by utilizing the process of this invention, to provide a source of the butenes from a readily available supply of propylene. If butene is present in an excess and the demand for propylene and the pentenes exceeds the supply, it is possible to provide the required propylenes and pentenes by utilizing butene as a source therefor.

It is therefore an object of this invention to provide a process for obtaining dissimilar olefinic hydrocarbons.

A further object of this invention is to provide a process for the dismutation of olefinic hydrocarbons in the presence of certain catalytic compositions of matter to provide dissimilar olefins.

In one aspect an embodiment of this invention resides in a process for the dismutation of an olefinic hydrocarbon which comprises treating said olefin with a catalyst comprising a metal oxyhalide in which the metal is present in an intermediate valence state under dismutation conditions, and recovering the resultant mixture of dissimilar olefins which contain one or more carbon atoms less and one or more carbon atoms more than the original olefin.

A specific embodiment of this invention is found in a process for the dismutation of an olefinic hydrocarbon which comrises treating pentene with a catalyst containing tungstenyl dichloride at a temperature in the range of from about ambient to about 75° C. and a pressure in the range of from about atmospheric to about 100 atmospheres in a benzene medium in an oxygen-free atmosphere, and recovering the resultant butenes and hexenes.

Other objects and embodiments will be found in the following further detailed description of the present invention.

As hereinbefore set forth the present invention is concerned with a process for the dismutation of olefinic hydrocarbons whereby olefins containing one or more carbon atoms more and one or more carbon atoms less than the original olefinic hydrocarbon may be obtained. The process is effected in the presence of certain catalysts of a type hereinafter set forth in greater detail under dismutation conditions which will include a temperature in the range of from ambient (about 25° C.) up to about 75° C. and a pressure ranging from atmospheric to about 100 atmospheres or more. Examples of olefinic hydrocarbons which may be subjected to the dismutation process of the present invention will preferably comprise those olefins containing from three to 10 carbon atoms in length and will include propylene, 1-butene, 2-butene, 1-pentene, 2-pentene, 1-hexene, 2-hexene, 3-hexene, 1-heptene, 2-heptene, 3-heptene 1-octene, 2-octene, 3-octene, 4-octene, 1-nonene, 2 -nonene, 3-nonene, 4-nonene, 1-decene, 2-decene, 3-decene, 4-decene, 5-decene, as well as the isomeric branch chain analogs of the aforementioned straight chain olefins. Alternatively, different olefins can be cross reacted to give other desired olefins; as for example, ethylene can be reacted with 3-hexene to produce butene-1. Other examples can be found in the reaction. of any sets of olefins on the above list and many dismutation products can be thus produced.

The catalytic composition of matter which is utilized to effect the dismutation of the olefin comprises a metal oxyhalide in which the metal is present in an intermediate valence state. The catalytic component of the metallic composition of matter will be selected from Groups IVB to VIIIB of the Periodic Table. Some specific examples of these metal oxyhalides in which the halide portion of the catalyst preferably comprises bromine or chlorine will include titanium oxychloride, titanium oxybromide, zirconium oxychloride, zirconium oxybromide, hafnium oxychloride, hafnium oxybromide, vanadium oxychloride, vanadium oxybromide, columbium oxychloride, columbium oxybromide, tantalum oxychloride, tantalum oxybromide, chromium oxychloride, chromium oxybromide, molybdenum oxychloride, molybdenum oxybromide, tungsten oxychloride, tungsten oxybromide, manganese oxychloride, manganese oxybromide, rhenium oxychloride, rhenium oxybromide, technetium oxychloride, technetium oxybromide, ferrous oxychloride, ferrous oxybromide, ruthenium oxychloride, ruthenium oxybromide, osmium oxychloride, osmium oxybromide, cobalt oxychloride, cobalt oxybromide, rhodium oxychloride, rhodium oxybromide, iridium oxychloride, iridium oxybromide, nickel oxychloride, nickel oxybromide, palladium oxychloride, palladium oxybromide, platinum oxychloride, platinum oxybromide, etc. It is also contemplated within the scope of this invention that other transition metal complexes containing other ligands can be used in this process, although perhaps not with equivalent results. Some examples of ligands which might be used are triaryl phosphines, trialkyl phosphines, carbon monoxide, beta-diketones such as acetylacetonate, cyanide, pyridine, dipipidine, 1,10-phenantholine, etc. Of the aforementioned metal oxyhalides the preferred catalysts will comprise molybdenum oxydichloride or tungsten oxydichloride in which the molybdenum and tungsten are present in an intermediate valence state of four. The aforementioned metal oxyhalides in which the metal is present in an intermediate valence state may be used per se or, if so desired, the catalyst may be dissolved in an inert solvent.

The process of this invention may be effected in any sutiable manner and may comprise either a batch or continuous type operation. For example, when a batch type operation is used a quantity of the olefinic hydrocarbon which is to undergo dismutation is charged to a reaction zone which contains the metal oxyhalide in which the metallic component of the catalyst is in an intermediate valence state. Inasmuch as said metal oxyhalide is present in an intermediate valence state the reaction is effected in an oxygen-free atmosphere. This oxygen-free atmosphere may be provided for by the presence of an inert gas such as nitrogen, the apparatus having been purged or swept with nitrogen prior to charging the olefinic hydrocarbon and catalyst thereto. In addition to the oxygen-free atmosphere in which the reaction is effected it may also be desirable to have said reaction effected in the presence of an inert organic solvent. This solvent may comprise a paraffinic hydrocarbon such as n-pentane, n-hexane, n-heptane, etc. cycloparaffinic hydrocarbons such as cyclopentane, methylcyclopentane, cyclohexane, etc. or aromatic hydrocarbons such as benzene, toluene, o-xylene, m-xylene, p-xylene, ethylbenzene, etc. or a halogenated solvent such as carbon tetrachloride, dichlorethylene, chlorobenzene, etc. After a predetermined residence time which may range from about 0.01 up to about 10 hours or more in duration, the reaction mixture is recovered and the olefinic hydrocarbons are separated by conventional means which will include fractional distillation under reduced pressure whereby the olefinic hydrocarbon containing one or more carbon atoms more and the olefinic hydrocarbon containing one or more carbon atoms less than the original olefinic hydrocarbon feed stock are recovered.

It is also contemplated within the scope of this invention that the dismutation of olefinic hydrocarbons may be effected in a continuous type of operation. When this type of operation is used a reaction zone containing the catalyst is maintained at the proper operating conditions of temperature and pressure. The olefinic hydrocarbons and the solvent are charged thereto through separate lines or, if so desired, they may be admixed prior to entering into said reactor and charged thereto in a single stream. After passage through the reaction zone for a predetermined period of time the reactor effluent is continuously withdrawn and subjected to conventional means of separation, whereby the olefinic hydrocarbon containing one or more carbon atoms more and the olefinic hydrocarbon containing one or more carbon atoms less than the original olefinic hydrocarbon feed stock are separated and recovered, any unreacted olefinic hydrocarbon being recycled to form a portion of the feed stock.

The following examples are given to illustrate the process of the present invention which, however, are not intended to limit the generally broad scope of the present invention in strict accordance therewith.

EXAMPLE 1

In this example the apparatus which is utilized to effect the dismutation of olefinic hydrocarbons is evacuated and a catalyst comprising tungstenyl tetrachloride is placed in the apparatus. A benzene solvent is dried over sodium and vacuum distilled onto phosphorus pentoxide in a glass flask for storage. In addition, the charge stock comprising cis-2-pentene which is dried over phosphorus pentoxide is also charged to an evacuated flask for storage and thereafter the dried pentene is vacuum distilled into the apparatus. Following this the benzene solution is poured into the apparatus and the reaction allowed to proceed for a period of 0.5 hours at 30° C. at atmospheric pressure. The samples of the solution are removed from the system by freezing appropriate quantities of the solution in a removal portion of the apparatus and thereafter vacuum sealing the remaining portion of the apparatus. A gas chromatographic analysis of the sample discloses that the olefinic yield from the dismutation of cis-2-pentene will result in the obtention of butenes and hexenes.

EXAMPLE II

In this example a charge stock comprising pentene-2 was dried over phosphorus pentoxide and stored. In addition a catalyst comprising molybdenum oxychloride which had been prepared by the oxidation of molybdenum hexacarbonyl utilizing bromine and air as the oxidizing ligands was also prepared and stored. An organic solvent comprising carbon tetrachloride which had been dried over calcium hydride and stored was utilized to dissolve the catalyst and the various components of the reaction were charged to a dried apparatus which had been evacuated. The apparatus was warmed to room temperature and maintained thereat for a reaction period of 10 hours. At the end of the aforementioned reaction time, gas chromatography analysis of the product disclosed the fact that there had been a dismutation of the pentene-2 with a resulting portion of butene and hexene.

EXAMPLE III

In like manner a reaction apparatus is dried and evacuated. The charge stock in this experiment which comprises 2-nonene is dried and stored prior to being charged to the reactor. The catalyst which is utilized to effect the dismutation of the nonene comprises molybdenyl dichloride which has been prepared by the reduction of molybdenum pentachloride utilizing phosphorus metal as the reducing agent and is dissolved in a portion of the benzene solvent, said benzene also having been dried prior to use thereof. The remaining portion of the dried benzene solvent, the 2-nonene and the catalyst are also charged to the dried and evacuated apparatus. After a reaction time of 0.5 hours has passed, during which time the apparatus and contents thereof are maintained at a temperature of 30° C. a gas-liquid chromatography analysis will disclose the fact that the nonene has been subjected to dismutation and that a mixture of octenes and decenes results therefrom.

EXAMPLE IV

In like manner a pressurizable reaction apparatus is dried and pruged with nitrogen. The charge stock in this experiment which comprises 3-hexene and ethylene are dried and stored as a mixture prior to being charged to the reactor. The catalyst which is used to effect the dismutation comprises tungsten oxydichloride which has been prepared by the oxidation of tris(triphenylphosphine)tricarbonyltungsten (0) utilizing oxygen and chlorine dissolved in carbon tetrachloride as the oxidizing ligands and is dissolved in carbon tetrachloride solvent, said carbon tetrachloride having been dried prior to use thereof. A portion of the catalyst solution is charged to the reactor along with the ethylene-hexene feed stock and the remaining portion of carbon tetrachloride solvent. After a reaction time of about 0.5 hours has passed during which time the apparatus and its contents are maintained at a temperature of 30° C. and a pressure of 40 atmospheres or less, a gas-liquid chromatography analysis will disclose the fact that the ethylene and hexene have been subjected to dismutation and that butene results therefrom.

I claim as my invention:

1. A process for the dismutation of an olefinic hydrocarbon which comprises treating said olefin with a catalyst consisting of a metal oxyhalide in which the metal is present in an intermediate valence state, under dismutation conditions, and recovering the resultant dissimilar olefins which contain one or more carbon atoms less and one or more carbon atoms more than the original olefin.

2. The process as set forth in claim 1 further characterized in that said process is effected in an oxygen-free atmosphere.

3. The process as set forth in claim 1 further characterized in that said process is effected in an inert organic solvent medium.

4. The process as set forth in claim 1 in which said conditions include a temperature in the range of from about ambient to about 75° C. and a pressure in the range of from about atmospheric to about 100 atmospheres.

5. The process as set forth in claim 1 in which said catalyst is tungstenyl dichloride.

6. The process as set forth in claim 1 in which said catalyst is molybdenyl dichloride.

7. The process as set forth in claim 3 in which said inert organic solvent is benzene or carbon tetrachloride.

8. The process as set forth in claim 1 in which said olefinic hydrocarbon feed stock is pentene and said dissimilar olefins are a mixture of butenes and hexenes.

9. The process as set forth in claim 1 in which said olefinic hydrocarbon feed stock is ethylene and hexene-3 and said dissimilar olefin is butene-1.

10. The process as set forth in claim 1 in which said olefinic hydrocarbon feed stock is butene, and said dissimilar olefins are a mixture of propene and pentene.

11. The process as set forth in claim 1 in which said olefinic hydrocarbon feed stock is butene-1 and said dissimilar olefins are a mixture of hexene-3 and ethylene.

12. The process as set forth in claim 1 in which said olefinic hydrocarbon feed stock is nonene and said dissimilar olefins are a mixture of octenes and decenes.

* * * * *